United States Patent [19]
Chang et al.

[11] Patent Number: 5,503,921
[45] Date of Patent: Apr. 2, 1996

[54] CORE WITH FOAMED SKIN COVERING

[75] Inventors: Peter M. Chang, Rancho; Steven M. Moran, Long Beach, both of Calif.

[73] Assignee: Kransco, San Francisco, Calif.

[21] Appl. No.: 148,690

[22] Filed: Nov. 5, 1993

[51] Int. Cl.⁶ .................................................. B32B 5/14
[52] U.S. Cl. .............................. 428/308.4; 428/318.6; 428/316.6; 428/319.9; 441/74
[58] Field of Search .................. 428/308.4, 318.6, 428/316.6, 319.9; 441/74

[56] References Cited

U.S. PATENT DOCUMENTS

| | | | |
|---|---|---|---|
| 4,273,816 | 6/1981 | Tollette | 428/35 |
| 4,806,412 | 2/1989 | Wank et al. | 428/203 |
| 4,850,913 | 7/1989 | Szabad, Jr. | 441/65 |
| 5,181,745 | 1/1993 | Jacobsen et al. | 283/94 |

*Primary Examiner*—Christopher W. Raimund
*Attorney, Agent, or Firm*—Kolisch, Hartwell, Dickinson, McCormack & Heuser

[57] ABSTRACT

A bodyboard with skins covering the top and bottom surfaces of a foam plank that forms a core in the bodyboard. The top skin is prepared by heat-expanding a foamable matrix layer having a polyolefin film deposited on the top surface of the matrix layer. With the application of heat, the matrix layer becomes a foam, and the polyolefin film softens and integrates with the foam. Graphics carried internally on the film become an integral part of the foam.

9 Claims, 1 Drawing Sheet

CORE WITH FOAMED SKIN COVERING

BACKGROUND AND SUMMARY OF THE INVENTION

This invention relates to articles which include a core and extending over one or more sides of the core a covering or skin. Laminated plastic structures of this description are used as recreational products, as exemplified by so-called bodyboards, which are used to ride on the waves in ocean surf.

A typical bodyboard has a core of stiff material, and this core might take the form of a plank of semi-rigid foam. The foam composition of the core provides necessary flotation. The core normally is covered over opposite sides with what are commonly referred to as skins. The skin which extends over the downwardly facing surface of the core, and that forms the bottom of the bodyboard, functions to provide protection for the inner core and also to provide a slippery surface, whereby the board moves through the water with minimal drag. The skin that extends over the opposite upper surface of the core, and which forms the top surface of the board, also provides the function of protecting the core which forms the board interior. Since this upper surface of the bodyboard is the surface which the user bears against when using the board, it is desirable for reasons of comfort and ease of use that this covering having a degree of softness not necessarily required in the skin that forms the bottom of the board. Furthermore, the skin on the top of the board, since it is not traveling through the water, but is supporting the user, should not be as slick as the bottom-forming skin, but have a textured quality, enhancing frictional contact with the user, so that the user does not slide off too easily.

Amusement devices, such as bodyboards, not infrequently have printed logos, art designs, or other forms of graphics portrayed on surface skins in the product. It is obviously advantageous in the manufacture of boards and like products that graphics of this description be produced in a durable manner, with the graphics being scratch-resistant and wear-resistant.

In general term, this invention concerns an improved construction for the skin covering a core in an article, such as a bodyboard, where the skin includes a thin layer of foam produced by expanding a foam-producing heat-expandable matrix layer, and the skin further includes, integrated with this foam, the residue of a polyolefin film earlier applied to cover the matrix layer, this film having softened during formation of the foam layer and after softening, traveling into the foam to integrate with the foam. The skin described is tough and wear-resistant. The skin may be prepared with a degree of softness promoting body comfort. The skin further is producible with a tactile texture on the outer surface, which is the natural surface texture of the foam produced by foaming of the matrix layer, this textured characteristic reducing the slipperiness of the skin when used for a covering such as in a bodyboard.

Another object of the invention is to provide improvements in the skin covering a core, featuring graphic imaging material incorporated into the skin in a novel manner that imparts substantial abrasion and wear resistance to the graphics portrayed.

Yet another object is to provide a core and skin covering combination which includes graphics incorporated with the skin, where the imaging material producing the graphics is an integral part of the foam which forms the covering skin.

Yet a further object is to provide a novel core and skin covering combination, where the skin is produced by providing a matrix layer of heat-expandable foam-producing polyolefin, and further providing a film disposed over the outer face of this matrix layer, this film having graphic imaging material incorporated in its interior. With heat applied, the matrix layer expands to produce a foam, and the film softens with the residue of the film together with the imaging material migrating over the surface of the foam produced by expansion of the matrix layer.

In a preferred embodiment of the invention, the polyolefin film which is applied over the matrix layer comprises inner and outer film layers, with the graphic imaging material extending as a deposit in the interface between the film layers. To obtain images in the final product which are sharp, distinct, clearly visible and attractive, excellent results are obtained by utilizing as the inner of the film layers a film layer which is non-light transmitting and opaque, preferably white, and using as the outer film layer, a clear non-opaque polyolefin material.

These and other objects and advantages are obtained by the invention, which is described herein below in conjunction with the accompanying drawings, wherein:

DETAILED DESCRIPTION OF THE INVENTION

In very general terms, following the invention, an extruded matrix layer is prepared of a heat-expandable, foam-producing polyolefin, such as polyethylene. A matrix layer of such material may be prepared in a conventional manner, using a blender or similar apparatus for mixing the ingredients of the layer. The usual ingredients include a polyethylene raw material, and incorporated with this material, suitable processing aids, and a blowing or foaming agent, such as the usual diamines or peroxides, which operate on the application of heat to produce a gas causing foaming of the polyolefin material. The polyolefin may have what is known in the art as a natural color, which is translucent or light-transmitting. Preferred, although not required, is the use of a cross-linking polyethylene material as the polyolefin.

Describing a particular embodiment of the invention, the blended polyolefin raw material is extruded in extruder 10 to produce a matrix layer 12 of the material, of approximately 1/16" thickness. The matrix layer of polyolefin is heat-responsive, in that upon the application of heat by the passage through an oven of approximately 400° F., and with a dwell time of approximately four minutes, the matrix layer converts into a foam layer having approximately twice the thickness of the original matrix layer, and further expanding in length and width dimensions to dimensions approximately doubling those of the original matrix layer. Expansion, therefore, of the matrix layer results in an overall volume increase of approximately a multiple of eight.

In producing a skin characterizing this invention, matrix layer 12 of heat-expandable foam-producing polyolefin has deposited over its top surface, and prior to the application of any heat, a non-foamable polyolefin or polyethylene film, which softens or melts at the temperatures involved in producing a foam from the matrix described. The polyolefin film specifically contemplated is one made up of two polyolefin film layers disposed with one against the other.

Figure 1:
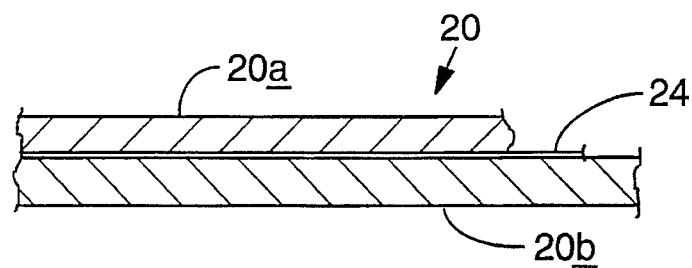
FIG. 1 is a cross-sectional view, on an enlarged scale, of a double layer polyolefin film which has incorporated within it graphic imaging material, the film being usable in preparing a skin as contemplated by the invention.

In FIG. 1, portions of a polyethylene film as contemplated herein are indicated at 20. The polyolefin film includes an upper film layer 20a, and a lower film layer 20b. These polyolefin film layers, in a typical example, are prepared from polyethylene with a softening point in the range of 180° to 200° F.

As earlier discussed, skins are producible following the invention which have graphic images clearly and attractively displayed on the skins. In preparing a skin, the imaging material which results in these images is distributed in the interface between film layers 20a and 20b.

The imprinting or placement of graphic imaging material on the interface between the two film layers may be done using any of several conventional processes for printing on polyethylene. Exemplary of such a process is the process known as corona printing. In corona printing, an electrical discharge temporarily alters the surface molecules of the polyethylene film, allowing inks compatible with the process to adhere to the film. Following the instant invention, preferably inks are employed with ultraviolet inhibitors which resist fading. Any desired pattern can be imprinted on the face of the sheet at the interface between the two sheet layers, and by way of example such a pattern may include words, logos, stylized graphics, color sweeps, etc. Different colors can be used in the process.

If the graphics are applied to tile undersurface of upper film layer 20a, the graphics are reverse printed, because they will be viewed through the film layer. On the other hand, if the graphics are printed on the upper face of the lower layer 20b, the graphics are not reverse printed as they are viewed directly.

In the example being described, a matrix has been discussed which undergoes an expansion with doubling of thickness, width and length when subjected to the heating process. As will be hereinafter apparent, with film 20 applied to the top of the matrix and then the matrix and film assembly subjected to heat, film 20 in effect disappears, with the residue of the film migrating over and integrating with the surface of the foam produced of the matrix layer. It should be obvious that as a result, the graphic pattern applied to the interface between the film layers 20a, 20b will be enlarged by the process, with the enlargement being approximately a doubling of the length and width of the graphic pattern originally born between the film layers.

In FIG. 1, the graphic imaging material is shown at 24. It should be understood of course that the drawing is not to scale, as it could not be, because of the small dimensions involved.

Polyolefin film 20 is collected on a roll or other means for storing a quantity of such film, as indicated at 26.

Figure 2:
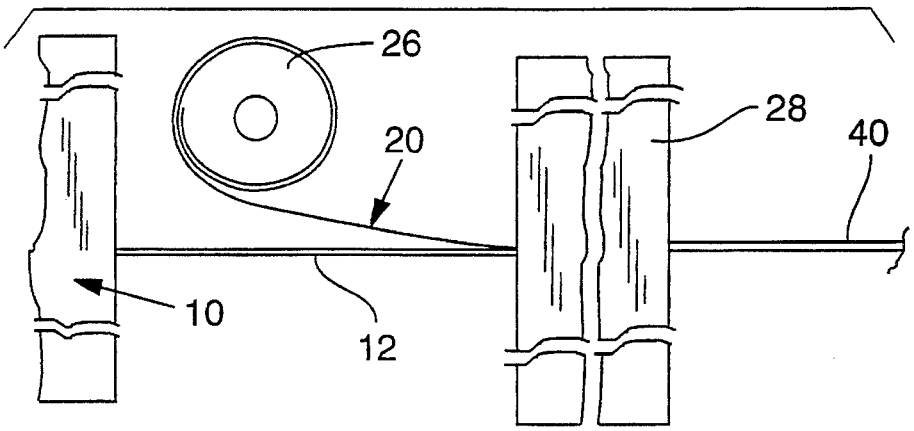
FIG. 2 is a simplified schematic illustration, showing how an extruded matrix layer having applied thereover a polyolefin film may be processed in an oven to produce an expanded composite as contemplated by the invention.

An expanded composite is prepared from the extruded matrix layer and film 20 by first placing film 20 directly onto the top of the matrix layer, as diagrammatically indicated in FIG. 2. The matrix layer and film then travel into an oven, portions of which are shown at 28.

Describing a particular example, an oven temperature of approximately 400° F. is maintained. The matrix layer with the superimposed film on traveling through the oven are exposed to a dwell time in the oven of approximately four minutes. While in the oven, the matrix layer expands approximately in the proportions earlier described, in width, length and breadth. The length of the expanded product is taken up in the oven so as to accommodate the expanding length that is occurring therein.

On leaving the oven, a product is formed which is illustrated at 40 in the drawing, and referred to herein as an expanded composite. The matrix layer in the product has foamed to produce a foam layer 41 having the porous internal appearance illustrated in FIG. 3. The film originally lying on the top of the matrix layer, under the oven temperature conditions, melts or softens with the residue of the film (42 in FIG. 3) migrating over the surface of the foam to become fully integrated with the foam product which is formed.

Figure 3:
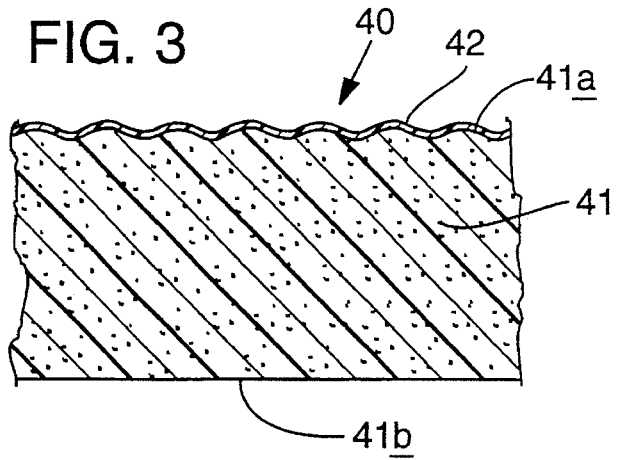
FIG. 3 is a cross-sectional view, on a larger scale, illustrating the expanded composite of the invention and the cellular construction thereof.

The top surface 41a of the foam is not perfectly smooth. Instead, the surface has a tactile texture with surface unevenness, as illustrated in FIG. 3. The surface unevenness is imparted to film residue 42 which has migrated over the surface of the foam. Typically, the hill and valley levels in the uneven surface resulting might have a spacing ranging from about 2 to 3 mils.

Figure 4:
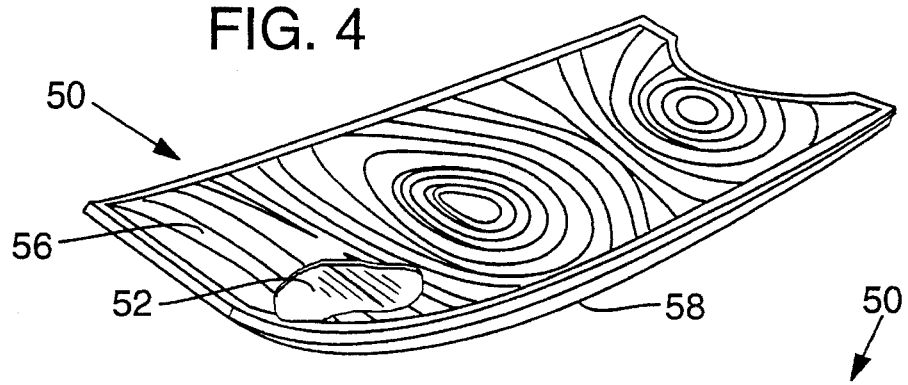
FIG. 4 is a perspective view illustrating a bodyboard, with a top skin made from the composite covering the top face of a core in the board, and with portions of the top skin broken away.

As contemplated by the invention, composite 40 is used to produce a skin in an article such as a bodyboard, which characteristically has a core of stiff material and, extending over top and bottom faces of this core, suitable water-resistant coverings or skins. In FIG. 4, such a bodyboard is illustrated given the number 50.

Bodyboard 50 includes a core 52 of stiff material. This core ordinarily taking the form of a foam plank, made up of a suitable semi-rigid foam providing stiffness but a certain degree of give. Describing a typical bodyboard, a core might have a thickness generally within the range of one to four inches.

Extending over the top surface of core 52 is a top skin shown at 56. This is suitably secured to the core, in a conventional manner, throughout the top face of the core. Only partially illustrated, but extending over the bottom of the core, is a bottom skin 58. The top and bottom of the core are covered as described with the top and bottom skins illustrated, and a suitable covering also extends in covering relation over side edges of the board.

The composite produced by the invention is utilized at least in the production of top skin 56. The composite is secured to core 52 with the top surface of the composite facing outwardly and bottom surface 41b of the composite facing the core and secured thereto.

Figure 5:
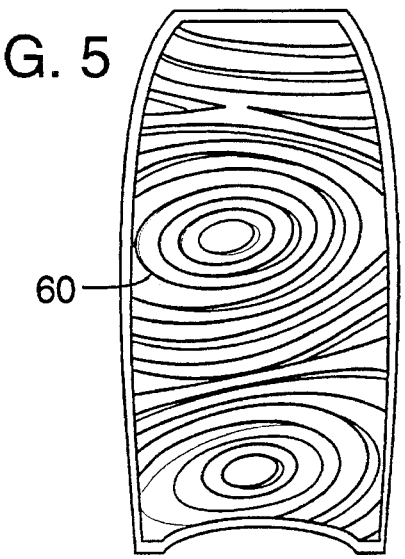
FIG. 5 is another view looking at the top skin of a bodyboard, showing graphics such as might be displayed on the board.

FIG. 5 illustrates the board with its to skin 56 portraying graphics 60 of the type that may be produced in the top skin.

A bodyboard prepared as described is characterized by a number of features which render it distinctive. Further elaborating, because the foam in the top skin has a degree of softness, a board with the top skin described is comfortable to use. The residue of the film which extends over the top surface of the foam provides increased toughness and wear resistance to the surface of the foam. The graphic imaging material is internally carried by the top skin of the board. As a consequence, a feeling of depth is imparted to the images portrayed by the imaging material. Furthermore, the graphics are portrayed in a manner which resists damage by scratching, rubbing or scraping. With the graphics in a sense born internally, the foam is referred to herein as expanded graphically enhanced foam.

In the example specifically described herein, upper film layer 20a utilized in the manufacture is comprised of a clear polyethylene and of 3 mils. thickness. Lower film layer 20b, to obtain optimum enhancement of the graphic material, is opaque, and usually is white. A thickness of 5 mils. for the lower layer has been described. To have optimum sharpness and clarity in the images produced in the final skin, preferably the upper film layer in film 20 is selected to have a thickness within the range of 2.5 to 4.5 mils., whereas the lower layer is selected to have a thickness within the range of about 4 to 6 mils. The invention described permits a wide range of different image effects to be produced in the skin of the bodyboard. Thus, different colors may be used, as well as different combinations of colors, and different art forms embodying different colors, logos, characters and printed matter may be displayed.

While a specific embodiment of the invention has been described, obviously modifications and variations are possible without departing from the invention.

It is claimed and desired to secure by Letters Patent:

1. Aboard for supporting a rider for travel comprising:

a core of a stiff material having opposed sides;

a skin extending in covering relation over at least one side of the core;

said skin comprising a layer of polyolefin foam having an inner surface attached to the core and an outer surface containing the residue of a polyolefin film, wherein said skin is produced by disposing a polyolefin film over a heat-expandable polyolefin layer and expanding the polyolefin layer at a temperature at which the film melts or softens so that the film becomes fully integrated with the foam surface.

2. Aboard for supporting a rider for travel comprising:

a core of a stiff material having opposed sides;

a skin extending in covering relation over at least one side of the core;

said skin comprising a layer of polyolefin foam having an inner surface attached to the core and an outer surface containing the residue of a polyolefin film, wherein said skin is produced by disposing a polyolefin film comprising graphic images on a heat-expandable polyolefin layer and expanding the polyolefin layer at a temperature at which the film melts or softens so that the film and the graphic images become fully integrated with the foam surface and the graphic images appear in an expanded state due to the expansion of the foam layer.

3. The board of claim 2, wherein the polyolefin film is a double-layered film including an outer film layer of polyolefin and an inner film layer of polyolefin, and wherein the graphic imaging material is distributed in a region sandwiched between the two film layers.

4. The board of claim 3, wherein the said inner film layer is colored and opaque, and the outer film layer is clear, and the inner film layer has a thickness within the range of 4 to 6 mils., and the outer film layer has a thickness within the range of 2.5 to 4.5 mils.

5. The board of claim 4, wherein the inner film layer is white.

6. The board of claim 2 wherein the polyolefin film comprises a clear layer and a colored layer and the polyolefin film is disposed with the colored layer facing the heat-expandable polyolefin layer.

7. The board of claim 6 wherein the graphic images are distributed between the colored layer and the clear layer.

8. The board of claim 2 wherein the outer surface of the skin is textured.

9. The board of claim 2 wherein the graphic images are disposed on the surface of the polyolefin film facing the heat-expandable polyolefin layer.

* * * * *